Aug. 31, 1954

C. J. STALEGO 2,687,551

METHOD AND APPARATUS FOR FORMING GLASS FIBERS

Original Filed May 6, 1947

INVENTOR.
CHARLES J. STALEGO
BY
ATTORNEYS

Aug. 31, 1954  C. J. STALEGO  2,687,551
METHOD AND APPARATUS FOR FORMING GLASS FIBERS
Original Filed May 6, 1947  3 Sheets-Sheet 3

INVENTOR.
CHARLES J. STALEGO
BY
ATTORNEYS

Patented Aug. 31, 1954

2,687,551

UNITED STATES PATENT OFFICE 2,687,551

METHOD AND APPARATUS FOR FORMING GLASS FIBERS

Charles J. Stalego, Newark, Ohio, assignor to Owens-Corning Fiberglas Corporation, a corporation of Delaware Original application May 6, 1947, Serial No. 746,280, now Patent No. 2,569,699, dated October 2, 1951. Divided and this application March 22, 1951, Serial No. 216,896

16 Claims. (Cl. 18—2.5)

This invention relates to an improved method and apparatus for producing fibers from heat softenable materials, such for example, as glass, and is a division of my application, Serial Number 746,280, filed May 6, 1947, now issued into Patent No. 2,569,699.

Fibers may be produced from a heat softenable material such as glass by feeding a filament or rod of glass into a blast having a temperature in excess of the melting temperature of glass and having a velocity sufficient to attenuate the molten glass into fibers of the specified size. A blast possessing the required characteristics has been successfully produced by burning a combustible gaseous mixture in a confined space or chamber and by discharging the products of combustion from the chamber through an opening restricted to impart a very high velocity to the products of combustion issuing from the opening.

One successful adaptation of the above process is to feed a glass filament into the blast along a path extending transversely of the direction of movement of the blast. As the advancing end of the filament is projected into the blast, it is melted by the heat of the blast and the molten glass is carried away in the form of a stream. One end of the stream may remain anchored to the filament for a period of time to enable drawing out or attenuating the stream into a fiber by the force of the blast.

There are a number of factors that control the quantity and size of the fibers ultimately blown or produced by the above process. Among these are the temperature of the blast, the velocity of the blast and the length of the blast over which the required attenuating temperatures and velocities are maintained. Under conditions where the above factors are optimum or nearly so, relatively long fibers having a diameter of one micron or less may be produced in commercial quantities from primary filaments of considerably greater diameter. Of course, secondary or final fibers having substantially greater diameters may be produced by employing larger primary filaments. The rate of feed of the primary filaments into the blast and the temperature, as well as the velocity of the blast, may be individually or collectively varied within limits to produce a variety of results in the size and quantity of the secondary fibers formed.

It is an object of this invention to increase substantially the rate of production of fine fibers from glass rods or filaments.

It is a further object of the invention to achieve this increase by substantially increasing the effective attenuating length of the blast. By increasing the effective attenuating length of the blast, the stream being carried away from the advancing end of the filament is maintained in a softened or molten state for a greater portion of its length and thereby enables the blast to act on a longer length of the stream to draw the same out into fine fibers.

A feature of this invention is to extend the effective attenuating length of the blast by protecting the blast from the cooling effects of the surrounding atmosphere. This may be accomplished in various ways. One satisfactory procedure is to direct a fluid or gaseous medium toward the blast from one or opposite sides of the blast adjacent the source of the blast. This medium may be heated by directing the same in heat conducting relation to a part of the blast producing burner, and is carried along the blast for a considerable distance by the force of the blast to form a protective shield between the blast and atmosphere.

Another feature of this invention is to envelop or substantially envelop the blast with a gaseous medium, such for example, as manufactured fuel gas, propane, natural gas or other combustible gases or mixed gases or gases mixed with air. Such a gaseous medium is fed to the blast adjacent the burner discharge opening, and is eventually ignited to substantially lengthen the attenuating region of the blast. The distance the supplementary gas travels along the flame before reaching the ignition temperature varies, depending upon whether the gas introduced to the blast is in a raw form or is mixed with air, or whether the raw gas or the gas mixed with air is preheated prior to introducing the same to the blast. In fact a small amount of oxygen may be mixed with the gas in the event it is desired to actually add heat to the blast along the attenuating length thereof. The rate at which the gas is introduced to the blast also has an effect on the resulting increase in length of the attenuating blast and enables controlling the turbulence of the attenuating portion of the blast. Turbulence of the blast has a salutary effect on the rate of fiber production.

This effect of turbulence on the production of fibers may possibly be explained on the basis that a turbulent condition in the blast causes the molten streams extending from the advancing ends of the primary filaments to vibrate, be whipped, or ripple (like a flag in the wind), and travel in a serpentine path. This action of the streams may result in greater resistance to relative movement between the streams and the blast, and as a result, increase the effectiveness of the blast to attenuate the streams into extremely fine fibers. Whether this is the true explanation or not, it has been found important to control the turbulence so that the fibers are not vibrated or whipped to such an extent that they will be ejected from the sides of the blast, and so that the fine fibers are not broken by the turbulent forces into lengths shorter than desired. The turbulence may be controlled within the desired limits by regulating the rate at which the supplemental gaseous medium is introduced to the blast.

Moreover the turbulence resulting from introducing supplementary gaseous medium to the blast in the above manner tends to produce curly or wavy fibers. Such fibers are especially advantageous in the production of yarn and may be more readily intermatted to form strong, resilient mats.

Another feature of this invention is to support gas injectors at opposite sides of the blast with discharge jets arranged to direct a gaseous medium along the blast to enlarge the attenuating area or zone of the blast and to provide a degree of turbulence in the attenuating zone. In cases whre it is desired to produce curly or wavy fibers, the jet or jets at one side of the blast may be offset with respect to the jet or jets at the opposite side in order to induce an undulating action in the blast. This turbulent action in the blast tends to impart a serpentine movement to the streams of molten glass as they are carried away from the advancing ends of the primary filaments and thereby provide fibers having a wavy contour.

A further object of this invention is to support supplementary burners at opposite sides of the path of the blast adjacent the discharge opening of the main burner to discharge the products of combustion along the blast at a rate depending upon the degree of restriction of the supplementary burner orifices. This rate may be varied depending upon the turbulence desired in the blast and may approach the speed of the blast in some instances. In any even the products of combustion discharged by the supplementary burners produces an intensely hot gas around the blast for a considerable portion of its length and thereby not only maintains the temperature of the blast throughout its length, but in addition, increases the depth of the blast at the zone of penetration of the filament or glass rod into the blast.

Still another feature of this invention is to locate a supplemental burner at one side of the blast with the discharge orifice directly opposite the path along which the filament or filaments are fed into the blast. The arrangement is such that the products of combustion from the supplemental burner also increases the effective thickness of the blast at the zone of penetration of the filaments into the blast and thereby enables feeding relatively large diameter primary filaments into the blast at a fast rate without the danger of the filaments passing through the blast. In addition the products of combustion issuing from the supplemental burner are carried along the underside of the blast and minimize cooling of the blast by the atmosphere. As a result the attenuating characteristics of the blast are greatly improved and the quantity of fibers capable of being produced from a single primary burner are increased.

The foregoing as well as other objects will be made more apparent as this description proceeds, especially when considered in connection with the accompanying drawings, wherein.

The present invention concerns itself more particularly with the manufacture of fibers from a heat softenable material, such for example, as glass by feeding glass into a blast moving at a velocity sufficient to attenuate molten glass into fibers having diameters of from one micron or less to several or more microns, depending upon the product to be manufactured from the fibers. In each of the various embodiments selected herein for the purpose of illustration, a plurality of primary glass filaments are fed in the direction of their length into the blast from one side of the latter, and the temperature of the blast is sufficient to melt the advancing ends of the filaments. The diameter of the filaments and rate of feed of the latter into the blast are predetermined to assure melting the advancing ends of the filaments before the latter are projected through the blast. The molten glass is carried away from the advancing ends of the filaments in the form of streams by the force of the blast. These streams remain anchored to the unmelted portions of the filaments for a period of time and the velocity of the blast is so great that the blast draws out the streams into fine fibers. The size of the secondary or final fibers produced may be varied by altering the characteristics of the blast and/or by varying the diameter of the primary filaments.

A blast having the required characteristics has been successfully produced by burning a combustible gaseous mixture in an enclosed chamber and exhausting the products of combustion through a restricted orifice which guides and accelerates the gases to form an intensely hot, high velocity blast. The type of combustible gas used may be of any suitable kind, but for reasons of economy, it is preferably an ordinary fuel gas, such as natural or manufactured fuel gas. This gas is mixed with the proper amount of air by means of an ordinary air and gas mixer. The gas and air mixture is taken from the mixer at moderate pressure of approximately one to five pounds per square inch or considerably more if desired, and is led through an ordinary conduit to an enclosed ignition chamber where ignition of the gaseous mixture takes place.

Figure 1:
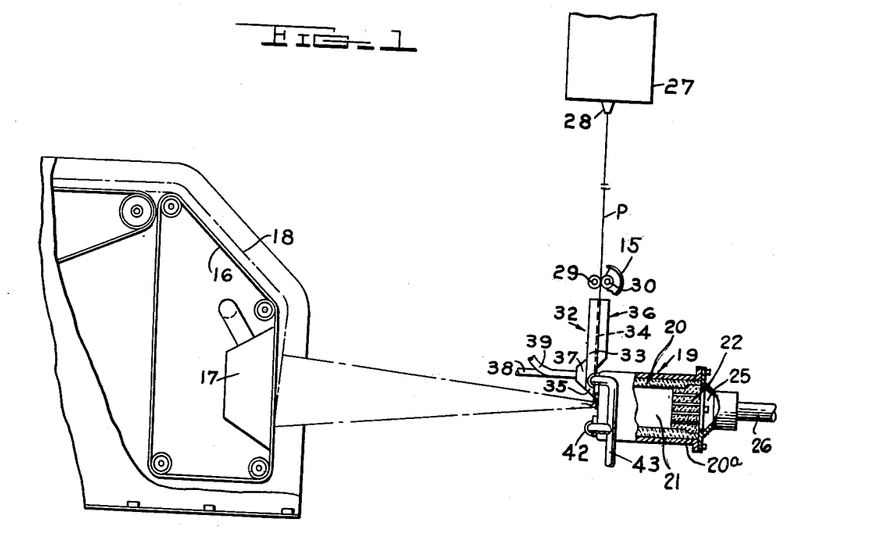
Figure 1 is a diagrammatic side elevational view of one type of apparatus for producing fibers in accordance with this invention.
Figure 3:
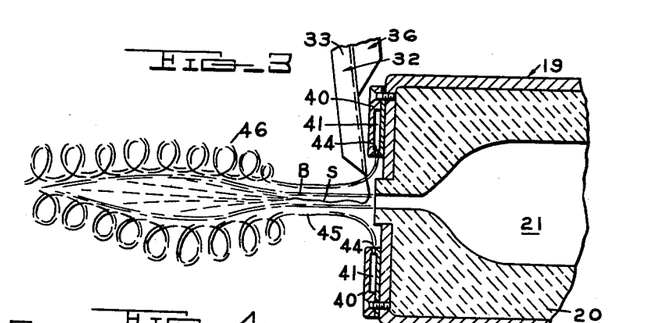
Figure 3 is a longitudinal sectional view showing the burner assembly and primary filament guide.

Referring to Figures 1 and 3 of the drawings, it will be noted that one type of apparatus is illustrated for burning the gaseous mixture to create the required attenuating blast. This apparatus comprises a burner 19 having a body 20 of refractory material and having a combustion chamber 21 therein. One end of the combustion chamber terminates at the perforated wall 22 having a plurality of small orifices extending therethrough, and the other end of the chamber is provided with a wall having a restricted outlet or discharge passage 23 therein. The refractory body may be surrounded by a sheet metal shell 20a which extends past one end of the body to form an inlet chamber 25 between the end of the shell and the perforated wall 22. A suitable conduit 26 connects with the shell to feed the combustible gaseous mixture into the inlet chamber 25. The gaseous mixture enters the inlet chamber 25 and passes through the orifices in the wall 22 and into the combustion chamber 21 where it ignites and burns with a resulting high degree of expansion. During operation the walls of the chamber 21 are heated by the burning gas and the hot walls tend to increase the rate at which the gas entering the chamber burns. The resulting high rate of combustion causes a great expansion of the products of combustion which, as they pass through the outlet passage 23, are accelerated into a very high velocity blast of intense heat. The aim is to feed as much gaseous mixture into the chamber 21 as possible without causing the combustion to become unstable or to take place at the outside of the chamber or to cease altogether.

The outlet passage 23 is elongated and is substantially less in cross-sectional area than the chamber 21, so that the products of the combustion taking place within the chamber are accelerated as they pass through the opening or passage 23 to provide a blast of the gases moving at a very high velocity. In this connection it may be pointed out that the cross-sectional area of the passage 23 may be varied to some extent relative to the cross-sectional area of the chamber 21, depending upon the heat required in the blast leaving the outlet passage. Passages of greater cross-sectional area relative to the cross-sectional area of the chamber 21 permit burning a greater amount of gas and result in greater heat of the blast, but also cause a decrease in the velocity of the blast. Preferably, however, the cross-sectional area of the outlet passage 23 is no greater than necessary to obtain in the blast the heat required to raise the glass to the attenuating temperature. The best relation of the cross-sectional area of the passage 23 to the cross-sectional area of the chamber 21 may be determined by simple trial, but will be found to be within the range of 1:8 to 1:4. This arrangement provides for obtaining the high velocity of the blast coupled with sufficient heat of the blast to quickly melt the glass to be attenuated.

The primary filaments P may be readily produced on a commercial basis by the apparatus diagrammatically shown in Figure 1 of the drawings. In detail the reference character 27 indicates a glass feeder or bushing which may be in the form of a long, relatively narrow trough, having a plurality of feeding orifices 28 in its bottom wall. Glass cullet or glass batch is fed to the bushing in any suitable manner and is heated while in the bushing to a molten condition. The molten glass flows from the orifices 28 in small streams which are attenuated to form primary filaments P by means of coacting feed rolls 29 and 30 located a distance from the bushing 27 sufficient to assure cooling of the fibers to solidification before engagement by the rolls. The feed roll 29 may be driven by an electric motor 15 indicated diagrammatically in Figure 1 of the drawings.

It has been found that the velocity and temperature of the blast is highest immediately adjacent the outlet opening 23 and decreases in both temperature and velocity as the distance from the orifice increases. Thus in order to take full advantage of the maximum temperature and velocity of the blast, the primary filaments P are fed into the blast as near the discharge opening 23 as practical. In accordance with this invention the primary filaments P are guided into the blast by a guide 32 supported below the coacting feed rolls 29 and 30. The guide 32 comprises a plate 33 elongated in the direction of the path of travel of the primary fibers leaving the feed rolls and having a plurality of laterally spaced grooves 34 corresponding in number to the number of primary fibers. The lateral spacing of the grooves 34 is such that these grooves respectively receive the primary fibers leaving the feed rolls and the grooves extend for the full length of the plate 33. The lower end portion 35 of the plate 33 extends downwardly in juxtaposition to the front burner wall and terminates substantially flush with the top wall of the passage 23. It is pointed out in this connection that the length of the passage 23 corresponds to the width of the plate 33 so that all of the primary fibers leaving the delivery end of the plate or guide are projected into the gaseous blast issuing from the passage 23.

The guide 32 is provided with a cover 36, which is secured to the rear face of the plate 33 over the grooves 34 to enclose the primary fibers. The lower end of a cover 36 terminates short of the portion 35 of the plate 33 to expose the primary fibers directly to the heat radiating from the front burner wall. Due to the fact that the portion 35 of the guide or plate 33 extends in such close proximity to the member 29 on the burner 19, this plate is subjected to extremely high temperatures, and if desired, may be cooled by providing a jacket 37 at the front side of the plate 33. A cooling medium from a suitable source may be conveyed to the jacket 37 through an inlet conduit 38 and discharged from the jacket through an outlet conduit 39.

It has been stated above that both the temperature and velocity of the blast decreases as the distance from the burner discharge opening 23 decreases. For the purpose of this description the zone or length of the blast having a temperature sufficiently high to maintain the glass streams projecting from the primary filaments in a softened state and having a velocity sufficient to draw out the softened streams will be considered the effective attenuating length or zone of the blast. Under ordinary conditions of operation this zone is somewhat restricted in length due to the expansion of the gaseous blast as it is discharged into the atmosphere and due to the loss of heat in the blast to the atmosphere.

In practice it is desirable to increase the effective attenuating length of the blast as much as possible, so that the streams are maintained in a molten or softened condition for a greater portion of their length, and as a result, are more effectively drawn out by the blast. Thus finer fibers may be produced at greater quantities from filaments of larger diameter.

Figure 2:
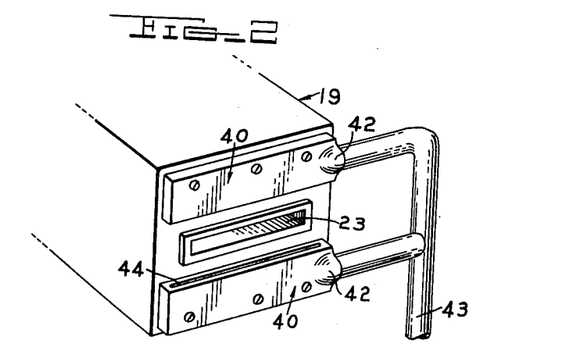
Figure 2 is a fragmentary perspective view of the burner assembly shown in Figure 1.

In accordance with this invention the effective length of the attenuating blast is substantially increased by protecting the blast from the cooling effects of the ambient atmosphere. With this in view, reference is made more in detail to Figures 1 to 3 inclusive wherein the reference numeral 40 indicates a pair of injectors secured or otherwise supported on the front wall of the burner 19 above and below the elongated discharge opening 23. Each injector 40 comprises an elongated chamber 41 having an enlargement 42 at one end adapted to communicate with a source of gaseous medium through a supply conduit 43. The injectors are positioned so that the elongated chambers 41 extend longitudinally of the discharge opening 23 in the front wall of the burner 19, and the gaseous medium contained in the chambers 41 is discharged through a series of orifices or elongated slots formed in the inner walls of the chambers 41. In the specific embodiment of the invention shown in Figures 1 to 3 inclusive, the gaseous medium is discharged from the chambers 41 through slots 44 extending parallel to the discharge opening 23 and having a length slightly greater than the length of this opening. The velocity of the supplementary gaseous medium issuing from the injectors 40 toward opposite sides of the blast B depends to some extent upon the restricted nature of the discharge slots 44, and in the present instance, is substantially less than the velocity of the products of combustion or blast discharged through the outlet opening 23 in the burner 19.

Any one of a number of different types of combustible gases may be introduced to the injectors 40, such for example, as natural gas, manufactured fuel gas, propane or mixed gases, or gases mixed with air. In any case the gaseous medium is directed by the injectors 40 against opposite sides of the blast B immediately adjacent the origin of the blast or the outlet opening 23. Thus the gaseous medium is carried along the blast B by the force of the latter for a considerable distance, and provides a protective covering for the blast B indicated in Figure 3 of the drawings by the reference character 45. The protective covering 45 of supplemental gas delays the transfer of heat from the blast B to the surrounding atmosphere and maintains the temperature of the blast above the melting or softening temperature of the glass filaments for a substantial portion of the length of the blast.

Inasmuch as the supplemental gaseous medium is combustible, it will eventually be ignited by the temperature existing in the blast and the resulting products of combustion substantially increases the width of the blast in an area spaced a substantial distance from the burner and indicated in Figure 3 of the drawings by the numeral 46. The distance from the burner at which ignition of the supplemental gaseous medium takes place may be varied by employing either a raw gaseous medium or one which is mixed with air. In the event a raw gaseous medium is used, ignition of the gas is delayed until sufficient air from the atmosphere has an opportunity to become mixed in the gas. Of course, this period of delay may be reduced by introducing gas mixed with air into the injectors 40. In fact, in some instances, it may be advantageous to actually mix a small percentage of oxygen with the supplemental gaseous medium to not only expedite ignition, but to also increase the temperature.

The primary fibers P are fed by the cooperating rolls 29 and 30 into the blast along the guide 32. The advancing ends of the fibers project through the upper portion of the layer of supplemental gas into the blast at a point immediately adjacent the discharge opening 23 in order to take full advantage of the maximum temperature and velocity of the blast. The extreme ends of the filaments are melted by the heat of the blast, and streams S of molten glass are continuously carried away from the filaments by the force of the blast. The streams remain anchored to the respective filaments, and are attenuated into extremely fine fibers by the force of the blast acting on the sides of the streams. Owing to the presence of the supplemental gaseous medium, the effective attenuating length of the blast is substantially increased as indicated in Figure 3 of the drawings, so that the streams S are maintained for a greater portion of their length in a molten or softened condition, and as a result, the kinetic forces in the blast may act along a longer length of the streams to draw the same out into finer fibers.

As graphically indicated in Figure 3 of the drawings, ignition of the supplemental gaseous medium produces turbulence in the blast B, and this turbulence causes the streams S to vibrate and assume an undulating motion. This condition may result in substantially increasing the resistance to relative movement between the streams and blast, and may be one of the reasons why such a high rate of attenuation is obtained with the present equipment.

Figure 4:
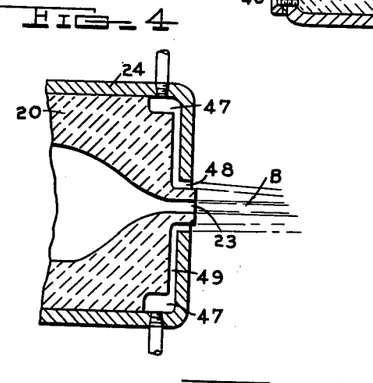
Figure 4 is a longitudinal sectional view through a modified form of burner assembly.

The ignition period of the supplemental gas may be shortened by preheating the supplemental gas prior to directing the same against opposite sides of the blast B. One possible way of accomplishing this result is shown in Figure 4 of the drawings, wherein it will be noted that the supplemental gaseous medium is fed to the blast in heat conducting relationship to the front wall of the burner. In detail the casing 24 of the burner cooperates with the body 20 of refractory material to form chambers 47 at opposite sides of the outlet opening 23. The chambers 47 communicate with a slot 48 in the front wall of the casing 24 through passages 49, and the desired combustible gaseous medium is conducted to the chambers 47 from a source of supply in any suitable manner. The slot 48 provides clearance at opposite sides of the discharge opening 23 to direct the gaseous medium through the front wall of the burner along the top and bottom sides of the blast B. With the above exceptions the construction shown in Figure 4 operates in the same manner as the embodiment previously described.

It is also possible to increase the effective length of the attenuating zone of the blast by discharging products of combustion toward opposite sides of the blast as it issues from the burner 19. Upon reference to Figure 5 of the drawings, it will be noted that a pair of booster burners 50 are supported on the front wall of the main burner 19 above and below the discharge opening 23 in the main burner. The top burner 50 is spaced laterally forwardly from the adjacent front wall of the main burner 19 to provide a slot 51 of sufficient dimension to enable feeding the primary fibers P into the blast B issuing from the main burner opening 23. Each of the burners 50 comprises a combustion chamber 51 in which a combustible gaseous medium is burned, and the products of combustion are discharged from the chamber 51 through restricted outlet openings 52 formed in the inner wall of the burner adjacent the front wall of the main burner 19. The combustible gaseous medium is introduced into the chambers 51 through suitable inlet ports 53, and this gas may be of the same type employed in the main burner, or may be any one of the other types of gases previously discussed in connection with the first described form of this invention.

Figure 5:
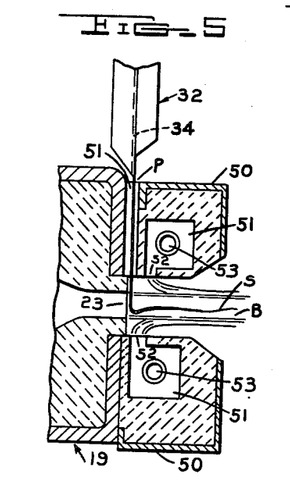
Figure 5 is a sectional view through another embodiment of this invention.
Figure 6:
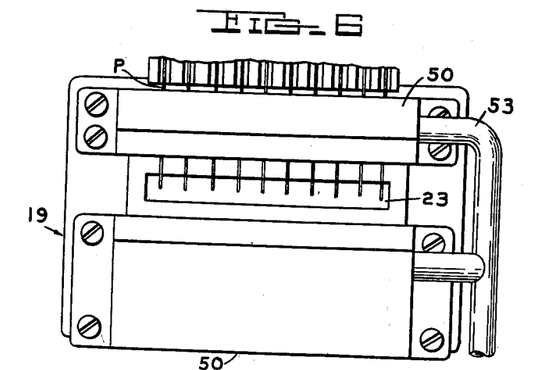
Figure 6 is an end elevational view of the construction shown in Figure 5.

The distance between the inner walls of the two burners 50 is somewhat greater than the width of the discharge opening 23, and the inner walls form, in effect, a continuation of the discharge throat of the main burner. Expansion of the blast B between the burners 50 is resisted by the products of combustion discharged from the burners 50, and these products of combustion form an intensely hot protective shield above and below the blast B to delay cooling of the blast by the atmosphere. The temperature of the products of combustion issuing from the supplemental burners 50 may be substantially increased by mixing a small percentage of oxygen with the combustible gaseous medium introduced to the burners 50. In any case the products of combustion issuing from the supplemental burners 50 minimize radiation of heat from the blast B for a substantial distance from the point of introduction of the primary filaments P into the blast, and thereby extends the effective attenuating length of the blast.

It will also be noted that the supplemental burners are arranged so that the outlet opening 52 of the lower burner 50 is positioned opposite the advancing ends of the primary filaments at the zone the primary filaments are introduced to the blast B. Thus the products of combustion issuing from the lower burner 50 increases the depth of the blast at the zone of introduction of the primary filaments into the blast and counteracts any possibility of the advancing ends of the primary filaments being projected entirely through the blast before being melted by the temperature of the blast. As a result primary filaments of greater diameter may be fed into the blast at a higher rate and the production of the apparatus is increased.

Although a certain amount of turbulence is produced in the attenuating area of the blast by the projection of the high velocity blast into the relatively stationary atmosphere beyond the supplemental burners 50, nevertheless, this turbulence is somewhat dampened by the fact that the supplemental gaseous medium is burned in the burners prior to being introduced to the blast and also due to the fact that the products of combustion from the supplemental burners is moving at a relatively high velocity. However, the extent of turbulence is sufficient to assist in drawing out the streams of molten glass into fine fibers which may be of substantial length because of the fact that the turbulence is less violent, and does not have sufficient force to break the fibers into short lengths. Furthermore by controlling the turbulence in the above manner, any tendency for the molten streams to vibrate out of the confines of the blast and produce objectionable slugs is avoided.

Figure 7:
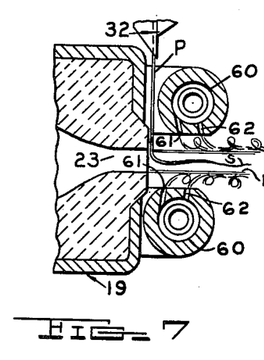
Figure 7 is a side elevational view partly in section of a further modification of this invention.
Figure 8:
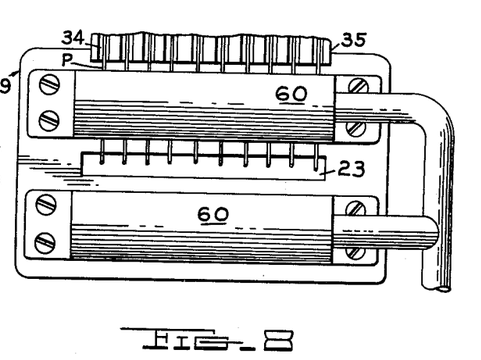
Figure 8 is an end elevational view of the construction shown in Figure 7.

In instances where it is desired to produce extremely fine fibers having a "curly" or "wavy" outline, the construction shown in Figures 7 and 8 may be employed. In this embodiment a pair of chambers 60 are suitably supported above and below the blast B in advance of the front wall of the burner 19. The chamber at the upper side of the blast B is spaced forwardly from the burner 19 a sufficient distance to enable the primary filaments P to be fed into the blast B at a point immediately adjacent the restricted outlet opening 23 in the burner 19. Each chamber 60 is formed with a pair of discharge passages 61 and 62 spaced from each other in the direction of movement of the blast B and extending at an angle to the blast to direct a gaseous medium against opposite sides of the blast in the direction of movement of the latter.

The gaseous medium supplied to the chambers 60 may be in the form of a raw combustible gas or gas mixed with air. In any case the gaseous medium is supplied to the chambers 60 under pressure and is ignited along the blast in the manner defined in connection with the embodiment of the invention shown in Figures 1 to 3 inclusive. It will also be understood that a combustible gaseous mixture of any one of the types listed above may be ignited in the chambers 60 and the products of combustion may be discharged through the passages 61 and 62 against opposite sides of the blast. Regardless of which of the above procedures are followed, the gaseous medium forms a protective shield around the blast B for a substantial distance extending from the zone the filaments are projected into the blast, and thereby substantially increases the effective attenuating length of the blast.

The turbulence produced in the effective attenuating length of the blast B depends to some extent on the velocity or rate of discharge of the gaseous medium against the blast, and this in turn depends largely on the size of the discharge passages 61 and 62. In the present instance the turbulence is further increased by offsetting the discharge passages in the lower chamber 60 from the passages in the upper burner in the direction of movement of the blast. As shown in Figure 7 of the drawings, the offset relationship is such that the passages cooperate to direct the gaseous medium against opposite sides of the blast B at points spaced from each other in the direction of length of the blast. This staggered arrangement of the discharge passages has a tendency to produce an undulating action in the blast B and thereby imparts a serpentine movement to the molten glass streams being drawn out from the respective primary filaments. This particular movement of the molten glass streams is indicated in an exaggerated manner in Figure 7 of the drawings and tends to produce wavy fibers.

Figure 9:
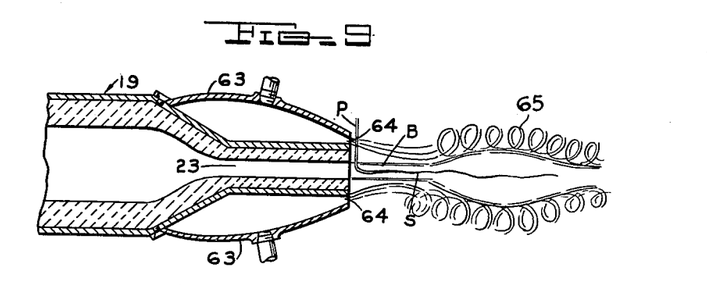
Figure 9 is a fragmentary sectional view of still another embodiment of this invention.

Still another arrangement is shown in Figure 9 of the drawings for enlarging and increasing the effective attenuating length of the blast B. In detail a pair of chambers 63 are secured to the top and bottom walls of the burner 19 adjacent the restricted burner outlet opening 23. A gaseous medium such, for example, as a raw combustible gas or a gas mixed with air is introduced to the chambers 63 under pressure from a suitable source of supply and is discharged from the chambers 63 through restricted outlet openings 64 in the form of elongated slots in the front ends of the chambers. The openings 64 are respectively located above and below the burner outlet opening 23 in a common vertical plane with the latter, so that the gaseous medium supplied to the chambers 63 is discharged from the latter along opposite sides of the blast B.

The combustible gas, whether raw or mixed with air, is carried along the blast B and protects the blast from the cooling effects of the surrounding atmosphere. In the event a combustible gas mixed with air is supplied to the blast, the heat of the blast ignites the gas at a point spaced from the outlet opening 23 and provides the blast with an enlarged zone 65. On the other hand, if a raw combustible gas is supplied to the blast B by the chambers 63, ignition of the gas is delayed until the required amount of air from the atmosphere combines with the gas. Thus the distance between the outlet opening 23 of the burner and the zone 65 may be controlled to some extent by the type of combustible gas employed. Regardless of whether raw or mixed combustible gas is use, the ignition period may be reduced by preheating the gas prior to discharging the same onto the blast B. In the present instance the inner walls of the two chambers 63 are formed by the outer walls of the burner 19, so that the heat radiating from the burner walls is absorbed by the supplemental gas passing through the chambers 63.

The primary glass filaments P are fed into the blast B immediately adjacent the outlet opening 23 along a path extending normal or substantially normal to the direction of movement of the blast. As a result the primary filaments are exposed to the heated supplemental gas issuing from the outlet opening 64 of the top chamber 63 as they approached the blast and are heated to some extent by this gas. This preheating of the primary filaments P is desirable because it facilitates melting the advancing ends of the filaments by the heat of the blast. As a consequence primary filaments of greater diameter may be fed into the blast at higher speeds to substantially increase the production of secondary glass fibers. In this connection it is further pointed out that the preheated gas in the bottom chamber 63 is discharged against the blast directly opposite the lower ends of the filaments and has the effect of increasing the thickness of the blast at this point so that any tendency for the advancing ends of the filaments to project through the blast prior to being melted is minimized.

As in the first described form of the invention, the molten glass at the advancing ends of the filaments is carried away in the form of streams S and the latter remain anchored to the filaments as they are drawn out by the force of the blast. The streams remain in a molten condition for a substantial portion of their length due to the action of the supplemental gas in protecting a considerable portion of the length of the blast from the cooling effects of the atmosphere. As a result a greater portion of the length of the streams is subjected to the kinetic forces of the blast and are drawn out into extremely fine fibers. This action is facilitated by the turbulence produced in the zone 65 by the combustion of the supplemental gas. This turbulence is sufficient to impart a vibratory motion to the streams of molten glass in the zone 65, or in other words, serves to orient the streams so that substantial portions of the length of the latter are extended transversely of the blast, and as a consequence, are more advantageously exposed to the force of the blast. This turbulence is controlled, depending upon whether short or long fine secondary fibers are required, and in any case, is prevented from reaching a magnitude that would displace the streams beyond the confines of the blast. In order to control the turbulence in the zone 65, the quantity of supplemental gas supplied and/or the rate of discharge of the gas through the openings 64 is regulated.

Figure 10:
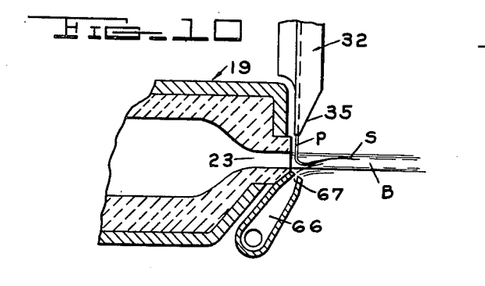
Figure 10 is a fragmentary sectional view of a further modified construction.
Figure 11:
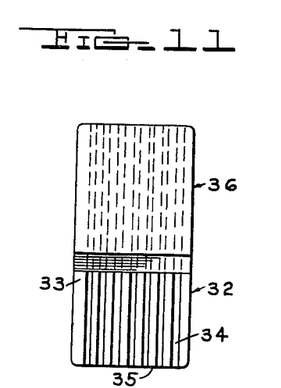
Figure 11 is an elevational view of one form of guide that may be used in connection with the apparatus shown in the above figures.

In Figure 10 of the drawings, a single supplemental burner 66 is supported below the discharge end of the main burner 19 with the outlet opening 67 directed toward the underside of the blast B issuing from the outlet opening 23 in the main burner. The burner 66 may operate on the some principle as the burner 19, and the outlet opening 67 is restricted to discharge the products of combustion against the underside of the blast at a velocity substantially less than the velocity of the blast B. Thus the products of combustion from the supplemental burner 66 are carried along the underside of the blast by the force of the latter, and not only protect the bottom of the blast from the cooling effects of the atmosphere, but in addition, increase the depth of the blast.

The primary filaments P are fed into the blast immediately adjacent the outlet opening 23 along a path extending substantially normal to the blast and the supplemental burner 66 is positioned so that the products of combustion are discharged against the bottom of the blast directly opposite the advancing ends of the primary filaments. Thus the products of combustion issuing from the supplemental burner 66 assists in melting the advancing ends of the primary filaments and avoids any tendency for the filaments to project clear through the blast before being melted. In other words, the products of combustion from the supplemental burner 66 actually increases the depth of the blast at the critical region where the primary filaments are fed into the blast and thereby increases the period of time available for melting the primary filaments without increasing the depth of the outlet opening 23 in the main burner 19. The increase in melting time provided by the supplemental burner 66 also enables increasing the rate of production of fine secondary fibers, because it permits feeding primary filaments P of greater diameter into the blast at a faster rate without the danger of projecting the filaments through the blast.

In each of the several embodiments selected herein for the purpose of illustration, provision is made for producing glass fibers of preselected lengths and diameter from glass filaments by feeding the latter into an intensely hot, high velocity blast obtained by burning a combustible gaseous mixture in a chamber having an outlet opening restricted to discharge the products of combustion from the chamber in the form of a blast moving at high velocity. As described the temperature of the blast exceeds the melting temperature of the glass filaments, so that the advancing ends of the filaments are melted as they are fed into the blast and the velocity of the blast is sufficiently high to draw out the molten glass in the form of streams. Also in each instance, provision is made for substantially enlarging and extending the effective attenuating zone of the blast by protecting the same from the cooling effects of the ambient atmosphere. Thus the glass streams are maintained in a molten or softened state for a greater portion of their length, and thereby lend themselves to more effective attenuation.

What I claim is:

1. The method of producing fibers from a heat softenable material which comprises burning a combustible gaseous mixture in a chamber provided with a restricted outlet opening through which the products of combustion are discharged in the form of a blast having a temperature sufficient to melt a body of the material and having a velocity sufficiently high to attenuate the molten material into fibers, feeding an elongated body of the material into the blast, and increasing the effective attenuating length of the blast by discharging the products of combustion from a supplementary burner at a velocity substantially less than the velocity of the blast and against the blast adjacent the restricted outlet opening.

2. The method of producing glass fibers which comprises burning a combustible gaseous mixture in a chamber provided with a restricted outlet opening through which the products of combustion are discharged in the form of a blast having a temperature sufficient to melt the glass and having a velocity sufficient to attenuate the molten glass into fibers, feeding a glass filament into one side of the blast in a direction transversely of the flow of the products of combustion forming the blast and at a point in close proximity to the outlet opening, and increasing the effective depth of the blast by substantially enclosing a considerable length of the blast with the products of combustion issuing from supplemental burners.

3. Apparatus for producing glass fibers, comprising a burner having a combustion chamber in which a combustible gaseous mixture is ignited and having an outlet opening restricted to discharge the products of combustion in the form of a blast having a temperature in excess of the melting temperature of glass and having a velocity sufficient to attenuate the molten glass into fibers, a second combustion chamber in which a combustible gaseous mixture is ignited and having a discharge opening positioned to discharge the products of combustion against the blast issuing from the burner outlet opening, and means for feeding a glass filament across the products of combustion issuing from the discharge opening in the second chamber and into the blast issuing from the burner outlet opening.

4. Apparatus for producing glass fibers, comprising a main burner having a combustion chamber in which a combustible gaseous mixture is ignited and having an outlet opening restricted to discharge the products of combustion in the form of a blast having a temperature in excess of the melting temperature of glass and having a velocity sufficient to attenuate the molten glass into fibers, means for feeding a glass filament into the blast at a point adjacent the outlet opening, supplemental burners having combustion chambers in which a combustible gaseous mixture is ignited and positioned at opposite sides of the burner outlet opening, and discharge openings in the supplemental combustion chambers arranged to discharge the products of combustion along opposite sides of the blast at velocities less than the velocity of the products of combustion discharged from the main burner.

5. Apparatus for producing glass fibers, comprising a main burner having a chamber in which a combustible gaseous mixture is ignited and having an outlet opening restricted to discharge the products of combustion in the form of a blast having a temperature in excess of the melting temperature of glass and having a velocity sufficient to attenuate the molten glass into fibers, means for feeding a glass filament into the blast at a point adjacent the outlet opening, supplemental burners having combustion chambers in which a combustible gaseous mixture is ignited and positioned at opposite sides of the burner outlet opening with the inner walls forming in effect a continuation of the burner outlet opening, and discharge openings in the inner walls of the supplemental combustion chambers adjacent the outlet opening in the main burner chamber for directing the products of combustion from the supplemental burners against opposite sides of the blast passing between said walls.

6. Apparatus for producing glass fibers, comprising a main burner having a combustion chamber in which a combustible gaseous mixture is ignited and having an outlet opening restricted to discharge the products of combustion in the form of a blast having a temperature in excess of the melting temperature of glass and having a velocity sufficient to attenuate the molten glass into fibers, supplemental burners each having a chamber in which a combustible gaseous mixture is ignited and positioned at opposite sides of the main burner outlet opening with the inner walls forming in effect a continuation of the burner outlet opening, discharge openings in the inner walls of the supplemental burner chambers adjacent said outlet opening for directing the products of combustion against opposite sides of the blast passing between said walls, and means for feeding a glass filament into the blast between one of the supplemental burner chambers and adjacent wall of the main burner in a direction toward the discharge opening in the other supplemental burner chamber.

7. Apparatus for producing glass fibers, comprising a main burner having a combustion chamber in which a combustible gaseous mixture is ignited and having an outlet opening restricted to discharge the products of combustion in the form of a blast having a temperature in excess of the melting temperature of glass and having a velocity sufficient to attenuate the molten glass into fibers, means for feeding a glass filament into one side of the blast at a point adjacent the main burner outlet opening, and a supplemental burner having a combustion chamber in which a combustible gaseous mixture is ignited positioned at the side of the blast opposite the side into which the glass filament is projected and having a discharge opening for directing the products of combustion against the blast directly opposite the path of travel of the filament.

8. Apparatus for producing glass fibers, comprising a burner having a combustion chamber in which a combustible gaseous fuel is burned and having an outlet opening to the atmosphere in one end of the burner to discharge the products of combustion in the form of a blast having a temperature in excess of the temperature at which glass can be drawn out into fibers and having a velocity sufficient to attenuate the glass heated by the blast into fibers, a second burner of elongated form having a combustion chamber in which a combustible gaseous mixture is burned arranged at one side of the outlet opening of the first burner and in proximity to the said end of the first burner, said second elongated burner located with its length extending crosswise of the direction of movement of the blast from the first burner, and means for feeding a glass filament between said second burner and the end of the first burner and into the blast issuing from the outlet opening of the first burner.

9. Apparatus for producing glass fibers, comprising a main burner having a combustion chamber in which a combustible gaseous mixture is burned and having an outlet opening restricted to discharge the products of combustion in the form of a blast having a temperature in excess of the temperature at which the glass can be drawn out into fibers and having a velocity sufficient to attenuate the glass heated by the blast into fibers, a supplemental burner of tubular form spaced from the end of the first burner and disposed at one side of the outlet opening thereof, said supplemental burner having a chamber in which a combustible gaseous mixture is burned and having an orifice to discharge the products of combustion against one side of the blast from the main burner, said supplemental burner extending transversely of the direction of movement of the blast of the first burner, and means for feeding a glass filament between the burners and into the blast.

10. The method of producing fibers from a material that can be drawn out into fibers when softened by heat which comprises substantially completely burning a combustible mixture of gases within a chamber and directing the products of combustion from the burning region through a restricted path to produce in the atmosphere a gaseous blast having a temperature above the softening temperature of the material and having a velocity sufficient to draw out the softened material into fibers, feeding heat softenable material into the blast and softening it and drawing it out into fibers by the blast, and extending the effective length of the blast by releasing a gaseous stream of products of combustion adjacent the source of the blast and at opposite sides thereof of a temperature above the softening temperature of the material and traveling at a velocity substantially less than that of the blast to heat the atmosphere adjacent the blast.

11. Apparatus for producing glass fibers comprising a main burner having a chamber adapted to burn a combustible mixture, said chamber having a restricted opening through which the products of combustion are discharged in the form of a blast having a temperature in excess of the attenuating temperature of glass and having a velocity sufficient to attenuate the heated glass into fibers, means for feeding a glass filament into one side of the blast from the main burner at a point adjacent the restricted opening of said burner, means including a supplemental burner adapted to burn a combustible mixture, said supplemental burner having an outlet through which the products of combustion therefrom are delivered against the blast from the main burner in the region opposite the path of travel of the filament.

12. The method of producing fibers from a heat softenable material which comprises burning a combustible gaseous mixture in a chamber provided with a restricted outlet opening through which the products of combustion are discharged in the form of a blast having a temperature sufficient to melt a body of the material and having a velocity sufficiently high to attenuate the molten material into fibers, feeding an elongated body of the material into one side of the blast at a point in close proximity to the outlet opening, and delivering a gaseous medium of products of combustion of a temperature above the melting temperature of the material against the opposite side of the blast in a direction transversely thereto and in proximity to the zone of the blast into which the body of material is introduced.

13. Apparatus for producing glass fibers comprising a main burner for producing a blast having a temperature in excess of the attenuating temperature of glass and having a velocity sufficient to attenuate the heated glass into fibers, means for feeding a glass filament into one side of the blast at a zone adjacent the main burner outlet opening, means including a supplemental burner for discharging a high temperature gaseous blast of products of combustion in a direction substantially normal to the blast produced by the main burner, the blast from the supplemental burner being of lesser velocity than that of the main blast and being substantially aligned with the path of travel of the filament and directed against the advancing end of the filament.

14. A method for producing glass fibers including burning a combustible gaseous mixture in a confined zone; discharging the products of combustion through a restricted orifice in the form of a blast having a temperature sufficient to soften a body of glass and having a velocity sufficiently high to attenuate the softened glass into fibers; feeding a body of glass into one side of the blast at a zone adjacent the restricted orifice; burning a combustible gaseous mixture in a second confined zone adjacent the blast, and projecting the products of combustion from the second confined zone at a velocity substantially less than that of the blast and against the blast substantially directly opposite the zone of entrance of the body of glass into the blast.

15. The method of producing glass fibers which includes the steps of burning a combustible gaseous mixture in a chamber provided with a restricted outlet through which the products of combustion are discharged in the form of a blast of a temperature in excess of the melting temperature of the glass and having a velocity sufficient to attenuate the molten glass into fibers, feeding a glass filament into one side of the blast at a point adjacent the burner outlet in a direction transverse to the direction of the blast, burning a combustible gaseous mixture in a second chamber provided with an outlet through which the products of combustion are discharged, and directing the products of combustion from the second chamber against the other side of the blast in a direction substantially opposite to the path of travel of the filament into the blast.

16. The method of producing glass fibers which includes the steps of burning a combustible gaseous mixture in a chamber provided with a restricted outlet through which the products of combustion are discharged in the form of a blast of a temperature in excess of the melting temperature of the glass and having a velocity sufficient to attenuate the molten glass into fibers, feeding a glass filament into one side of the blast at a point adjacent the burner outlet in a direction transverse to the direction of the blast, burning a combustible gaseous mixture in a second chamber provided with an outlet through which the products of combustion are discharged, and directing the products of combustion from the second chamber against the other side of the blast and onto a zone surrounding the projected path of the filament being fed.

References Cited in the file of this patent

UNITED STATES PATENTS

| Number | Name | Date |
| --- | --- | --- |
| 2,233,304 | Bleakley | Feb. 25, 1941 |
| 2,489,242 | Slayter et al. | Nov. 22, 1949 |
| 2,499,218 | Hess | Feb. 28, 1950 |
| 2,569,699 | Stalego | Oct. 2, 1951 |